(12) United States Patent
Feuer et al.

(10) Patent No.: US 8,351,788 B2
(45) Date of Patent: Jan. 8, 2013

(54) DIGITAL LIGHT PATH LABELING SYSTEM WITH DUAL POLARIZATION QUATERNARY PHASE-SHIFT KEYING MODULATION

(75) Inventors: Mark D. Feuer, Colts Neck, NJ (US); Vinay Anant Vaishampayan, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 239 days.

(21) Appl. No.: 12/836,339

(22) Filed: Jul. 14, 2010

(65) Prior Publication Data

US 2012/0014695 A1 Jan. 19, 2012

(51) Int. Cl.
*H04J 14/00* (2006.01)
*H04J 14/06* (2006.01)
*H04B 1/00* (2006.01)

(52) U.S. Cl. ........... 398/68; 398/65; 398/54; 375/146

(58) Field of Classification Search ............ 398/65, 398/146, 54
See application file for complete search history.

(56) References Cited

U.S. PATENT DOCUMENTS

| | | | | |
|---|---|---|---|---|
| 5,172,366 A * | 12/1992 | Chikuma | | 369/120 |
| 7,085,969 B2 * | 8/2006 | Zheng et al. | | 714/701 |
| 7,340,168 B2 * | 3/2008 | Giles et al. | | 398/47 |
| 7,512,342 B1 * | 3/2009 | Feuer et al. | | 398/77 |
| 7,580,632 B1 * | 8/2009 | Feuer et al. | | 398/32 |
| 7,587,641 B1 * | 9/2009 | Sloane et al. | | 714/701 |
| 7,630,636 B1 * | 12/2009 | Feuer et al. | | 398/51 |
| 7,715,461 B2 * | 5/2010 | Odenwalder | | 375/146 |
| 7,873,282 B2 * | 1/2011 | Secondini et al. | | 398/147 |
| 7,925,160 B2 * | 4/2011 | Feuer et al. | | 398/51 |
| 8,019,222 B2 * | 9/2011 | Feuer et al. | | 398/78 |
| 8,045,864 B2 * | 10/2011 | Ann et al. | | 398/202 |
| 2004/0057531 A1 * | 3/2004 | Rooyen et al. | | 375/267 |
| 2005/0069329 A1 * | 3/2005 | Giles et al. | | 398/188 |
| 2008/0280583 A1 * | 11/2008 | Chattopadhyay et al. | | 455/327 |
| 2009/0148170 A1 * | 6/2009 | Perkins | | 398/152 |
| 2009/0169210 A1 * | 7/2009 | Feuer et al. | | 398/77 |
| 2010/0287452 A1 * | 11/2010 | Xu et al. | | 714/786 |
| 2010/0322629 A1 * | 12/2010 | Nagarajan et al. | | 398/65 |
| 2012/0207474 A1 * | 8/2012 | Inoue et al. | | 398/65 |

OTHER PUBLICATIONS

Ohara et al; Demonstration of lightpath labeling technique for multipath DPSK signals; Mar. 2009; Optical society of America.*

* cited by examiner

*Primary Examiner* — Kenneth N Vanderpuye
*Assistant Examiner* — Amritbir Sandhu

(57) ABSTRACT

A method and system for encoding and determining labels in a Dual Polarization (DP) Quaternary Phase Shift Keying (QPSK) signal is provided. A label frame, signature sequence, and data payload are combined using a complementary constant-weight code encoding (CCWC) encoder, the output of which is deinterleaved and differentially precoded to generate a polarized tributary of a DP-QPSK signal. This encoding can be duplicated for a second tributary of the DP-QPSK signal. The label can be determined using one or more polarizers and corresponding low-speed photodetectors, each applied to a copy of the DP-QPSK signal. The strongest output of the photodetectors is then used to determine the label. Alternatively, the DP-QPSK signal can be viewed as having XI, XQ, PH, and PV tributaries. These tributaries can then be translated into XI, XQ, YI, and YQ tributaries are encoded into a standard DP-QPSK signal.

10 Claims, 6 Drawing Sheets

DIGITAL LIGHT PATH LABELING SYSTEM WITH DUAL POLARIZATION QUATERNARY PHASE-SHIFT KEYING MODULATION

The present application is generally directed to optical networking, and more particularly to encoded label information within an optical signal.

BACKGROUND

Packet networks transport data from a source location to a destination location by organizing the data into self-contained units called packets. Each packet carries its routing information as it passes through a series of routing nodes on its way to the destination location. Each routing node reads the routing information associated with the packet and uses that information to decide the correct path to use to forward the packet. In traditional IP (Internet Protocol) networks, the routing information is made up of individual addresses of source and destination nodes. In more advanced MPLS (Multiprotocol Label Switching) networks, packets are assigned additional labels that group them according to their intermediate or final destinations. This label assignment promotes efficient scaling and quality-of-service assignment in the MPLS networks.

Optical labels can also be useful in circuit-switched networks, especially those capable of dynamically re-routing signals on a wavelength-by-wavelength basis. Typical optical labels are encoded using amplitude-shift keying (ASK) formats, with a particular emphasis on ON-OFF keying (OOK). However, as data rates increase and modulation techniques change (e.g., QPSK and DP-QPSK modulation), OOK can no longer be applied.

SUMMARY

The present application describes a label encoding scheme in which codewords are constructed from the symbols available in a primary modulation format in such a way as to embed in the data stream a label encoded in a (different) secondary modulation format. Thus, the primary modulation format can be selected to optimize high-data-rate information transfer, while the secondary format optimizes the robustness and low cost of label reception.

In accordance with an embodiment of the present application, a label can be encoded into a Quaternary Phase Shift Keying (QPSK) signal. A binary encoded label frame, a binary signature sequence, and a binary data payload are combined into a composite data stream, which is deinterleaved into a first and second data stream. The first and second data stream can then be differentially precoded to output a respective first and second QPSK tributary.

With appropriate encoding of the composite data stream, the label message can be encoded in Differential (binary) Phase Shift Keying (DPSK) format, while the payload remains in QPSK format.

In yet a further feature of the present application, a label can be encoded in a Dual Polarization (DP) QPSK signal. The process described above is duplicated for each of the two polarized tributaries of the DP-QPSK signal, and the resulting label message in DPSK format is robust against unintended polarization sensitivity in the label receiver.

In accordance with a further feature of the present application, the label frame, the signature sequence, and the data payload are combined using a complementary constant-weight code encoding (CCWC).

In another embodiment of the present application, a label can be encoded into a DP-QPSK signal as a Polarization Shift Keying (PolSK) label. The PolSK label embedded in the DP-QPSK signal is analyzed with a polarizer and a low-speed photodetector configured to output the amplitude of the polarized signal at a rate significantly slower than the first symbol rate. Based on the output of the low-speed photodetector, the label can be determined.

Determination of the PolSK label encoded in a DP-QPSK signal can also be accomplished using multiple polarizers, each applying a different polarization to a branch of the DP-QPSK signal. Each polarized branch of the signal is then analyzed by a low-speed photodetector configured to output the amplitude of that branch. Using select-strongest or another algorithm, information from the branch outputs can be combined to determine the label in the presence of arbitrary polarization rotation occurring in the transmission path.

In accordance with yet a further aspect of the present application, a label can be encoded using a basis translator to convert the horizontal and the vertical states of a PolSK format into the YI and YQ tributaries of the DP-QPSK signal. The binary payload is first deinterleaved into a first and second data stream. The first data stream and a CDMA (Code-Division Multiple Access) chip stream are input to a complementary constant-weight code (CCWC) encoder, which outputs a CCWC-encoded signal. The CCWC-encoded signal is deinterleaved into a horizontal polarization (PH) and a vertical polarization (PV) tributary, which are then translated into a DP-QPSK signal having an I tributary (YI) and a Q tributary (YQ).

The second data stream can be translated into a second polarized signal having an I tributary (XI) and a Q tributary (XQ) by padding the first input data stream to match the symbol rate of the CCWC encoder, and deinterleaving the padded data stream into the XI tributary and the XQ tributary.

Alternatively, the second data stream and a CDMA chip stream can be input to a complementary constant-weight code (CCWC) to output a CCWC-encoded data stream. The CCWC-encoded data stream is then deinterleaved into two data streams each of which is differentially precoded to produce a DPSK label embedded in the XI tributary and the XQ tributary.

In accordance with one embodiment a system is provided for encoding a label in a Quaternary Phase Shift Keying (QPSK) signal, the system comprising: a CCWC encoder receiving as inputs a label frame comprising a binary encoding of the label, a binary signature sequence for code-division multiple access, and a first binary data payload, and configured to output a first composite data stream; a deinterleaver configured to deinterleave the first composite data stream into a first and second data stream; a first differential precoder configured to differentially precode to the first data stream and output a first QPSK tributary; and a second differential precoder configured differentially precode to the second data stream and output a second QPSK tributary.

In accordance with a further embodiment of the system for encoding a label in a Quaternary Phase Shift Keying (QPSK) signal, the QPSK signal is a Dual-Polarization (DP) QPSK signal, and the first and second QPSK tributary are a respective first and second tributary of a first polarization of the DP-QPSK signal, and the system further comprises: a second CCWC encoder receiving as inputs the label frame, the binary signature sequence, and a second binary data payload, and configured to output a second composite data stream; a second deinterleaver configured to deinterleave the second composite data stream into a third and fourth data stream; a third differential precoder configured to differentially precode the third data stream and output a third tributary of a second polarization of the DP-QPSK signal; and a fourth differential precoder configured differentially precode the fourth data stream and output a fourth tributary of the second polarization of the DP-QPSK signal.

In accordance with a further embodiment of the system for encoding a label in a Quaternary Phase Shift Keying (QPSK)

signal the optical QPSK signal has a constant number of 180 degree phase reversals per block, each block having a predetermined number of bits.

In accordance with a further embodiment a system is provided for determining a label encoding in a DP-QPSK encoded signal having a first symbol rate, the system comprising: a first polarizer configured to analyze a first polarization component of the DP-QPSK signal; and a first low-speed photodetector configured to detect the first polarization component and output the magnitude of the first polarization component at a rate significantly slower than the first symbol rate.

In accordance with a further embodiment of the system for determining a label encoding in a DP-QPSK encoded signal having a first symbol rate, the system further comprises: a code-division multiple access decoder configured to separate label messages from at least two optical wavelengths coincident on the low speed photodetector.

In accordance with a further embodiment of the system for determining a label encoding in a DP-QPSK encoded signal having a first symbol rate, the system further comprises: an optical splitter configured to split the DP-QPSK encoded signal into at least a first DP-QPSK signal and a second DP-QPSK; a second polarizer configured to analyze a second polarization component of the DP-QPSK signal; and a second low-speed photodetector configured detect the second polarization component and output the magnitude of the second polarization component.

In accordance with a further embodiment of the system for determining a label encoding in a DP-QPSK encoded signal having a first symbol rate the first polarizer is applied to the first DP-QPSK signal, and the system further comprises: a selector is configured to select a strongest output from among the first low-speed photodetector output and the second low-speed photodetector output.

In accordance with a further embodiment of the system for determining a label encoding in a DP-QPSK encoded signal having a first symbol rate, the first polarizer is applied to the first DP-QPSK signal, and the selector is further configured to compute a weighted linear combination of the first low-speed photodetector output and the second low-speed photodetector output.

In accordance with a further embodiment of the system for determining a label encoding in a DP-QPSK encoded signal having a first symbol rate the first polarizer is one of a linear polarizer, and a circular polarizer, and the second polarizer is a polarizer configured to select a polarization separated by 90 degrees on the Poincare sphere from the first selected polarization.

In accordance with a further embodiment of the system for determining a label encoding in a DP-QPSK encoded signal having a first symbol rate the optical splitter is further configured to split the DP-QPSK encoded signal into a third DP-QPSK signal, and the system further comprises: a third polarizer configured to analyze a third polarization component of the DP-QPSK signal; and a third low-speed photodetector configured to detect the third polarization component and output the magnitude of the third polarization component.

In accordance with a further embodiment a system is provided for encoding a label in a DP-QPSK signal, the system comprising: a deinterleaver configured to deinterleave a binary payload having a symbol rate into a first and second input data stream; an first encoder configured to encode the first input data stream as a first polarized signal having an I tributary (XI) and a Q tributary (XQ); a second encoder configured to apply a complementary constant-weight code (CCWC) encoding to the second input data stream and a binary chip stream incorporating label data to generate a CCWC-encoded signal; a deinterleaver configured to deinterleave the CCWC-encoded signal to determine a horizontal polarization (PH) tributary and a vertical polarization (PV) tributary; a basis translator configured to translate the PH, and PV into data streams defining an I tributary (YI) and a Q tributary (YQ) of a second polarized signal; and generating a DP-QPSK signal based on XI, XQ, YI, and YQ.

In accordance with a further embodiment of the system for encoding a label in a DP-QPSK signal, the first encoder is further configured to apply a complementary constant-weight code (CCWC) encoding to a binary chip stream incorporating label data and the first input data stream, deinterleave the CCWC encoded first input data stream into the XI tributary and the XQ tributary; and differentially precode each of the XI tributary and the XQ tributary.

In accordance with one embodiment a system is provided for encoding a label into a composite signal such that the modulation format of the label is different from the modulation format of the composite signal, the system comprising: means for constructing the composite signal from codewords, each codeword containing at least two symbols; such that each codeword has a known number of phase reversals between its constituent symbols; and means for choosing among the codewords according to a binary encoding of the label message, such that the known number of phase reversals represents at least one element of the label message.

In accordance with a further embodiment a system is provided for encoding a label into a composite signal such that the modulation format of the label is different from the modulation format of the composite signal, the system comprising: means for constructing the composite signal from codewords, each codeword containing at least two symbols; such that each codeword has a known number of occurrences of a defined polarization state among its constituent symbols; and means for choosing among the codewords according to a binary encoding of the label message, such that the known number of occurrences of the defined polarization state represents at least one element of the label message.

These and other advantages of the application will be apparent to those of ordinary skill in the art by reference to the following detailed description and the accompanying drawings.

DETAILED DESCRIPTION

Figure 1:
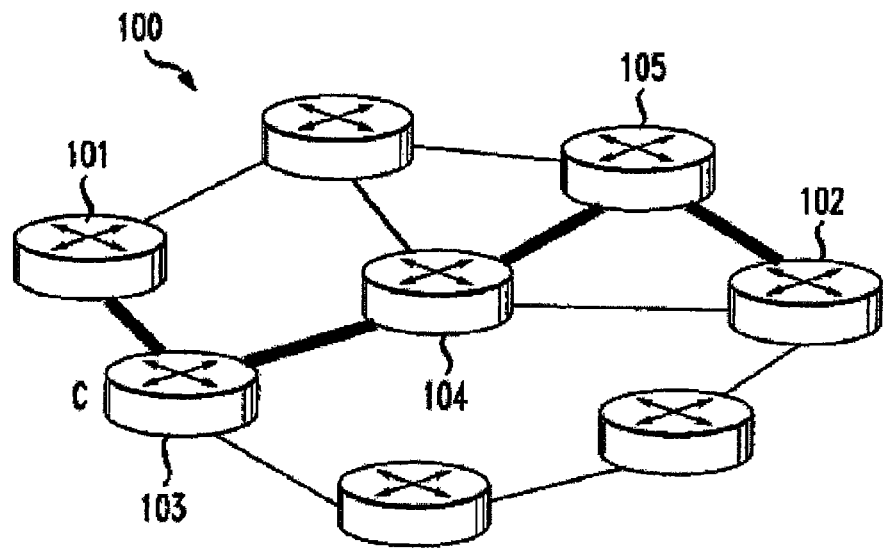
FIG. 1 illustrates an exemplary optical network in accordance with an embodiment.

FIG. 1 illustrates an exemplary optical network 100, in accordance with an embodiment of the present application. For each network path, one node is designated as a source node 101, one or more nodes are designated as intermediate nodes, 103, 104 and 105, and one or more nodes are designated as destination nodes, (e.g., destination node 102). Each node has a connection to at least one other node, and there should be a path or route between any source node 101 and destination node 102.

Figure 2A:
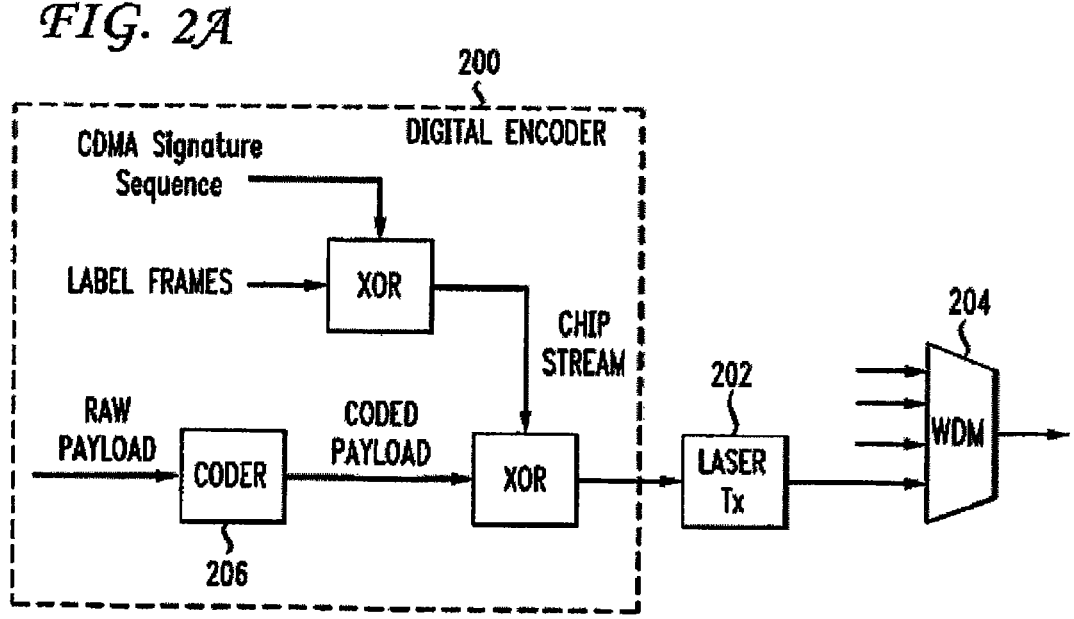
FIG. 2A illustrates an exemplary apparatus for encoding and transmitting optical data in accordance with an embodiment.

As disclosed in U.S. Pat. No. 7,580,632, which is incorporated herein by reference, FIG. 2A illustrates an apparatus for encoding label data into an optical signal using ON-OFF keying (OOK) that may be included, for example, in source node 101 of optical network 100. The apparatus includes a digital encoder 200 and a laser transmitter 202. In accordance with one embodiment of the present application, the apparatus includes a wave division multiplexer (WDM) 204.

Digital encoder 200 includes coder 206, which encodes each group of K bits of raw payload data into a block of N bits of coded payload data, where K<N. Digital encoder 200 employs a complementary constant-weight code (CCWC) with $2^{K+1}$ codewords. Half of the codewords have a constant weight of W, where W<N/2, and a second half of the codewords have a constant weight of N−W, obtained by inverting or complementing each codeword having a constant weight of W. Each group of K bits of the raw payload data are encoded by coder 206 into a block of N bits of coded payload data by using a codeword of constant weight W. Thus, the weight of the blocks of coded payload data is uniform, and the average power is constant.

A label message includes routing information for an optical packet or other useful information. In accordance with one embodiment, each label message is spread by a signature sequence such as, for example, a CDMA signature sequence, by passing the label message and the signature sequence through an exclusive OR (XOR) gate, to produce binary chip data. The rate of the binary chip data is the faster of the label data rate and the signature sequence data rate. For example, if the label data has a rate of about 50 kilobits per second and the signature sequence has a rate of about 10 Megabits per second, the resulting binary chip data may have a rate of about 10 Megabits per second. Further, because of the differences in data rates between the label message and the signature sequence, each bit of the label message, when combined with the signature sequence, is XOR'ed with multiple bits of the signature sequence, thereby producing multiple bits of binary chip data. The number of chips of binary chip data that result from combining one label message bit with the signature sequence is C.

The blocks of coded payload data are then XOR'ed with the binary chip data to produce coded composite data blocks. This XOR process replaces some of the blocks with their complements, producing coded composite data whose average power shows a binary modulation according to the chip stream, with effective modulation index (1−2W/N). For a single label message frame, the composite data has a length of C chips of B data blocks each, where each block comprises N bits of composite data. In one specific implementation, N may be 1,024, B may be 1, and C may be 200, thereby making the label frame size in this implementation 204,800 bits.

The CDMA (Code Division Multiple Access) layer provides a mechanism for many packets on different wavelengths in a WDM network to share a single all-wavelength label receiver. The CDMA-based spectrum spreading may also contribute to a longer averaging interval that enhances immunity to noise, including optical amplifier noise. The fully-coded composite data, combining both payload data and label frames in a single binary sequence, is fed to a standard optical transmitter such as, for example, laser transmitter 202, to produce an OOK optical signal that can be combined with similarly coded optical signals at other wavelengths by a wave division multiplexer (WDM) 204 for transmission through the optical packet network.

Although the above-described implementation may use constant-weight codes, a person of ordinary skill in the art would understand that other complementary codes can be used. Further, the CDMA layer is optional and can be replaced by other multiple access strategies, such as Orthogonal Frequency Division Multiple Access, or omitted entirely in non-WDM networks. In accordance with a further embodiment, two complementary code blocks may represent each pattern of payload bits, and the label frame may be encoded into the weight of these two alternative code blocks. Also, in single-wavelength implementations, the coded payload data may be XORed with the bits of the label data instead of with the chip stream. However, because the payload data rate is much higher than the label data rate, each bit of label data may be XOR'ed with many bits of coded payload data.

Figure 2B:
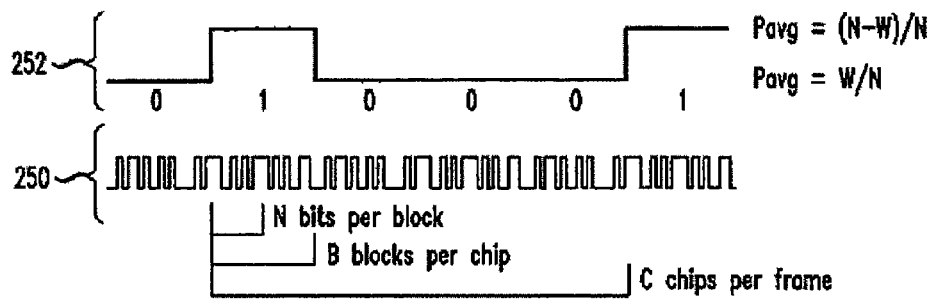
FIG. 2B shows aspects of exemplary encoding of coded payload data with a chip stream in accordance with an embodiment.

FIG. 2B illustrates encoding of a portion of chip data onto a portion of coded payload data to produce coded composite data 250. Coded composite data 250 is shown as having N bits per block, B blocks per chip, and C chips per frame. Chip data portion 252 is shown as chips 010001, which are to be encoded onto the portion of the coded payload data to produce coded composite data 250. In the example of FIG. 2B, each chip of chip data 252 may be encoded into N*B bits of coded composite data 250. For example, each 0 chip of chip data 252 is encoded over B blocks of N bits of coded payload data producing N*B bits of coded composite data 250 in which each block of N bits has an average power of W/N, and each 1 chip of chip data 252 is encoded over B blocks of N bits of coded payload data producing N*B bits of coded composite data 250 in which each block of N bits has an average power of (N−W)/N. Thus, chip data 252 may be recovered from coded composite data 250 based on the average power of B blocks of N bits each.

Although the above example describes each 0 chip of chip data 252 being encoded into coded composite data 250 as a group of blocks having an average power of W/N, and describes each 1 chip of chip data 252 being encoded into coded composite data 250 as a group of blocks having an average power of (N−W)/N, each 0 chip of chip data 252 may be encoded into a group of blocks having an average power of (N−W)/N, and each 1 chip of chip data 252 may be encoded into a group of blocks having an average power of W/N.

As data rates increase, optical networking equipment is moving toward the use of Quaternary Phase-Shift Keying (QPSK) and Dual Polarization Quaternary Phase-Shift Keying (DP-QPSK). Label encoding suitable for standard OOK modulation, as described above, cannot be applied to DP-QPSK. Therefore, other techniques, such as those described herein, must be used to extend digital labeling to DP-QPSK signals. The receivers needed to recover signals in DP-QPSK format are undesirably complex and costly for use as label readers. The present application describes an encoding of data transmitted in a complex modulation format (e.g., QPSK or DP-QPSK) in such a way that digital labels in a simpler modulation format (e.g., DPSK or PolSK) are simultaneously created. One such technique uses a variant of the label codes in which codewords are chosen not for constant weight but for a constant number of 180 degree phase transitions (i.e., phase flips) per block, creating a label in DPSK format. Another such technique applies similar codewords to a basis translator to create a label in PolSK format.

Figure 3:
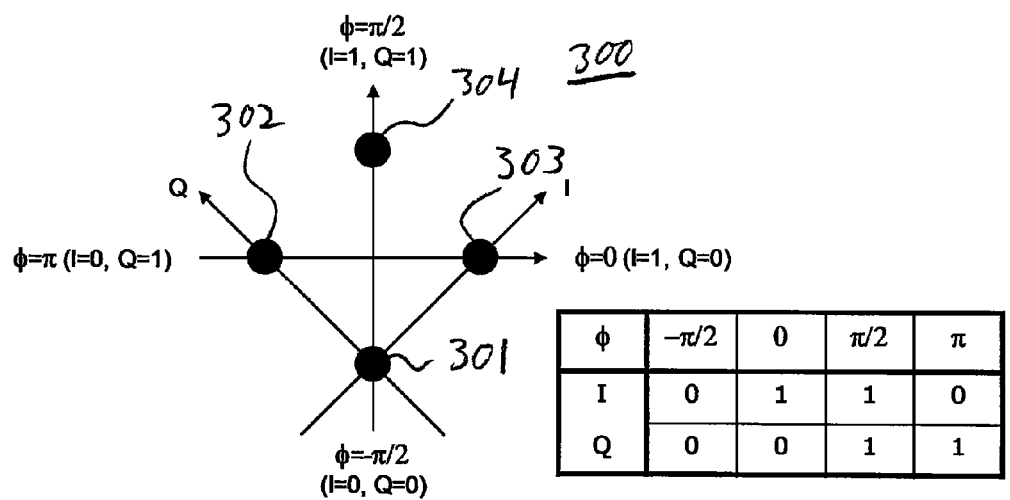
FIG. 3 is a phasor diagram and state table of a QPSK signal in accordance with an embodiment.

QPSK encodes two bits per symbol, as illustrated in the phasor diagram 300 of FIG. 3, by using four points, equispaced around a circle. Thus, a single-polarization QPSK signal (e.g., linearly polarized in the "X" direction), can encode a bit sequence using the I and Q tributaries (i.e., the XI and XQ tributaries). For example, the QPSK signal can encode the bit sequence "00" at point 301, at which the signal phase $\Phi=\pi/2$, the bit sequence "01" at point 302, at which $\Phi=\pi$, the bit sequence "10" at point 303, at which $\Phi=0$, and the bit sequence "11" at point 304, at which $\Phi=\pi/2$.

DP-QPSK modulation can be described as independent QPSK modulation of optical waves that are linearly polarized in the X and Y directions. Thus, DP-QPSK enables transmission of 4-bits per symbol period, which are characterized as 4 phase states in each of the 2 polarizations for a total of 16 possible state vectors. Because a single coherent laser source is used to generate both the X-polarized and Y-polarized signals, the instantaneous polarization launched from the transmitter can have 4 possible values: +45 deg linear, −45 deg linear, RH circular, and LH circular. Thus the DP-QPSK signal may alternatively be described as having one of four polarization states and one of four phases for its X polarization component, again for a combined total of 16 states or 4 bits. In this polarization-based description, the four tributaries may be defined as XI, XQ, PH, and PV, where PH and PV represent horizontal and vertical linear polarization, respectively.

Figure 4:
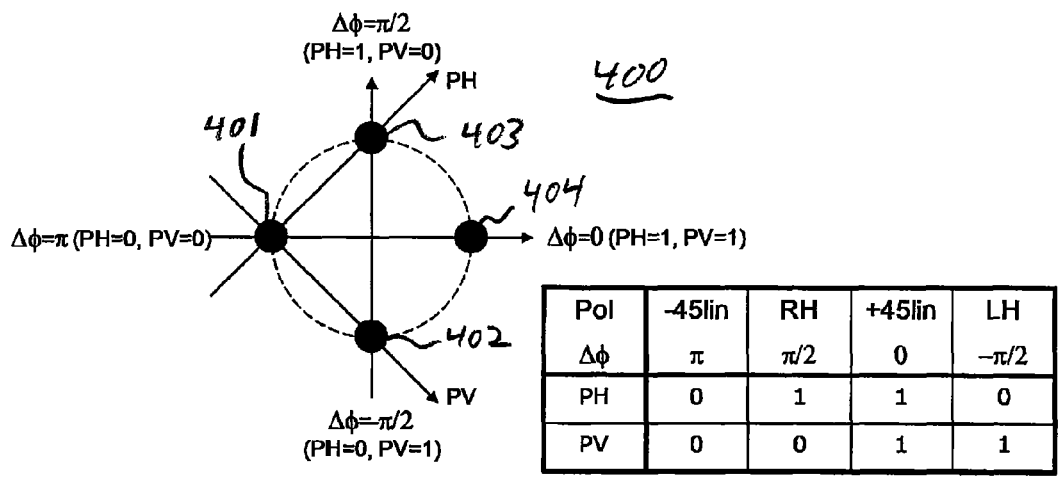
FIG. 4 is a phasor diagram and state table of a PolSK signal in accordance with an embodiment.

FIG. 4 illustrates a phasor diagram 400 for the horizontal and vertical polarization states (i.e., the PH and PV tributaries) of a DP-QPSK signal. The phasor diagram 400 can be viewed as a great circle on the Poincare sphere describing the launched polarization. Each polarization state represents a known phase difference $\Delta\phi$ between the Y (vertical) and the X (horizontal) waves, with $\Delta\phi$ being 0 (+45 deg linear) at point 404, $\pi$(−45 deg linear) at point 401, $+\pi/2$ (RH circular) at point 403, and $-\pi/2$ (LH circular) at point 402.

Figure 5:
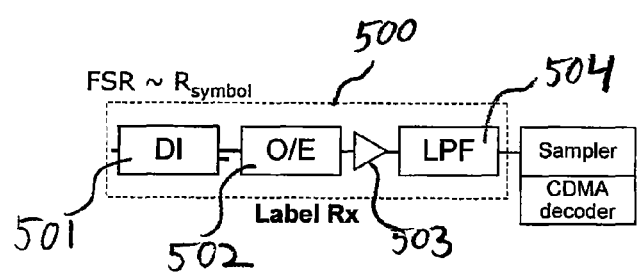
FIG. 5 is a receiver for DPSK-encoded labels in accordance with an embodiment.

In accordance with one embodiment of the present application, FIG. 5 illustrates a delay interferometer based label receiver 500 that is capable of determining a DPSK-formatted digital label embedded into a QPSK or DP-QPSK as described herein. The receiver 500 includes a delay interferometer 501 having a delay approximately equal to the symbol period. The output of the delay interferometer 501 is then processed by an Optical-to-electrical converter 502 incorporating a low-speed photodetector, amplified by amplifier 503, and put through a lowpass filter 504 to reduce noise. The low-speed photodetector cannot respond at the symbol rate and therefore outputs an average value over a period of time significantly greater than the period of the symbol rate. The required photodetector response will depend on the choice of coding parameters; in a typical example, the photodetector bandwidth might be about 0.1% of the coded payload rate. In accordance with one embodiment of the present invention, the photodetector responds at a rate less than one-half the symbol rate. In a further embodiment, the photodetector responds at the chip rate. The delay-interferometer 501 can be shared among all wavelength channels, if the free spectral range (FSR) is an integer sub-multiple of the channel spacing. It will be recognized by one skilled in the art that the low-pass filter shown in FIG. 5 may be omitted, and its function carried out within the Optical-to-Electrical converter or another element of the label reader system.

In accordance with a further aspect of the present application, the delay interferometer 510 of the receiver 500 has a free spectral range (FSR) that is a precise sub-multiple of the optical channel frequency spacing, in order to recover phase information from all channels simultaneously. If the symbol rate is not a precise sub-multiple of the channel spacing (e.g., 10.7 GS/s for 50 GHz channel spacing) the delay time could be non-optimal, causing some variation in the label receiver's sensitivity.

Figure 6:
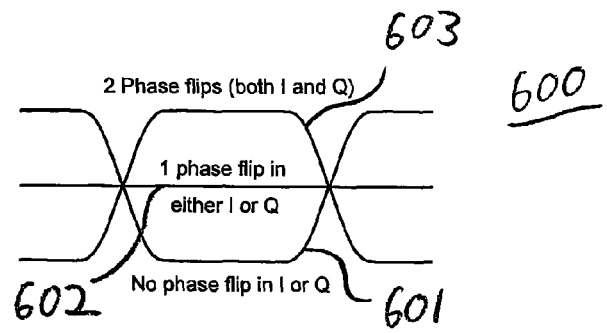
FIG. 6 is an idealized eye diagram of the output of a receiver in accordance with an embodiment.

FIG. 6, illustrates an idealized eye diagram 600 of a single-polarization QPSK signal after passing through a delay interferometer, such as delay interferometer 501 of receiver 500. The top rail 603 represents bits in which both the I and Q tributaries have flipped their phase from the previous bit (i.e., phase shift of $\pi$). The bottom rail 601 represents bits in which neither the I nor Q tributary have phase-flipped (i.e., phase shift of 0). The middle rail 602 represents bits in which either the I or Q tributary, but not both, have phase-flipped (i.e., phase shift of $\pm\pi/2$). If the middle rail 602 is evenly spaced between the top rail 603 and bottom rail 601, the total power received during a time interval is the sum of the phase flips in the I tributary and Q tributary of the QPSK signal. While the use of a slow photodetector blurs adjacent symbols into each other, the summing property remains the same and the delay interferometer based label receiver 500 of FIG. 5 can output a running average count of the total phase flips in both the I tributary and the Q tributary, which identifies the label encoded in the signal.

Figure 7:
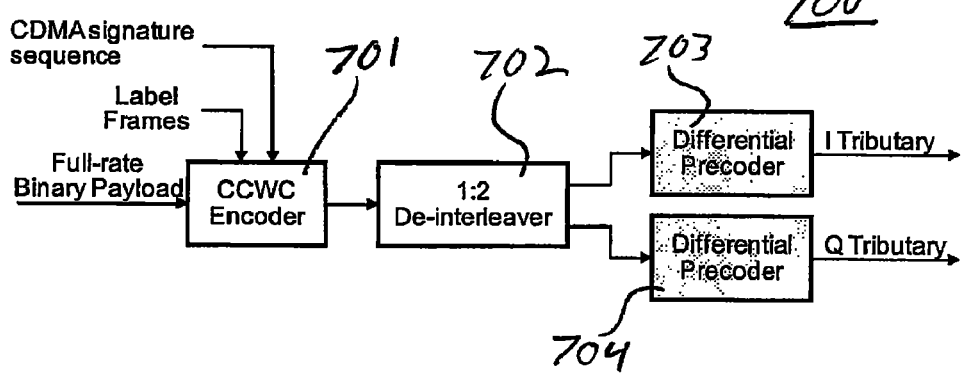
FIG. 7 is an encoder for DPSK labels in accordance with an embodiment.

In accordance with a further embodiment, a label can be encoded in a QPSK signal using a complementary constant-weight coding (CCWC) applied to the full rate binary payload stream. The CCWC encoded stream is then deinterleaved to feed separate differential precoders for the I tributary and the Q tributary. An exemplary QPSK label encoder 700 is illustrated in FIG. 7. As illustrated, the full-rate binary payload, the label frames, and the CMDA signature are input to CCWC encoder 701. The output of CCWC encoder 701 is fed as input to a 1:2 deinterleaver 702. A first output of the deinterleaver 702 is fed to differential precoder 703 for encoding the I tributary of the QPSK signal, and a second output of the deinterleaver 702 is fed to differential precoder 704 for encoding the Q tributary of the QPSK signal. In this way, the constant-weight codewords, which are encoded into the QPSK signal, define symbol blocks having a known total number of phase flips per word. While the occupation of each rail of the eye diagram may vary from block to block because the individual phase flips of the I tributary and Q tributary are uncorrelated, the received power per block for a given label can only have two values. Accordingly, the delay-interferometer receiver 500 of FIG. 5 can decode the label by counting the average total phase flips in both tributaries and correlating that average to a particular label, as described above.

It should be noted that as compared to a differential phase-shift keying (DPSK) signal having the same signal rate, if the codeword length (N) is the same, the chip rate and the label data rate would double for the QPSK signal. Alternatively, the codeword length could be doubled (2N) for the QPSK signal in order to maintain the original label data rate with a smaller coding overhead.

The QPSK label encoder 700 described above utilizes only a single polarization. However, the two polarizations of a DP-QPSK signal could be independently encoded with the same chip pattern, using label encoder 700. Assuming that the delay interferometer and the photodetector are polarization-independent, the launched polarizations remain orthogonal during fiber propagation, and the differential group delay (DGD) is much less than the chip time (e.g., 100 ns), independent label encoding of the two polarizations results in a label signal that is not affected by polarization rotations, which can occur in optical fiber transmission. Full joint coding of all four tributaries in a DP-QPSK system can achieve further improvements in either data rate or overhead.

Figure 8:
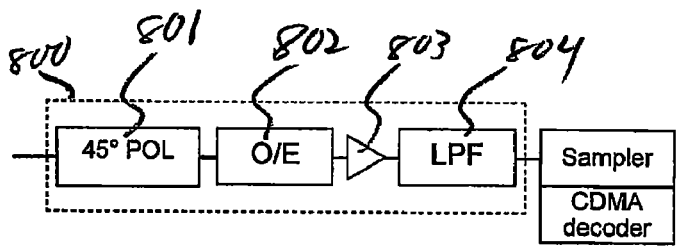
FIG. 8 is a receiver for PolSK-encoded labels in accordance with a further embodiment.

In yet a further aspect of the present application, a DP-QPSK signal label receiver can be configured without a delay interferometer. In view of the description of the phasor diagram of FIG. 4, a receiver for PolSk-formatted labels can be composed of polarizers in front of slow photodetectors. One such receiver 800 is illustrated in FIG. 8. Specifically, receiver 800 includes a +45 degree linear polarization to maximize the label signal for the as-transmitted signal. The signal is then processed through an optical-to-electrical converter 802 incorporating a low-speed photodetector, an amplifier 803, and a low-pass filter 804.

Figure 10:
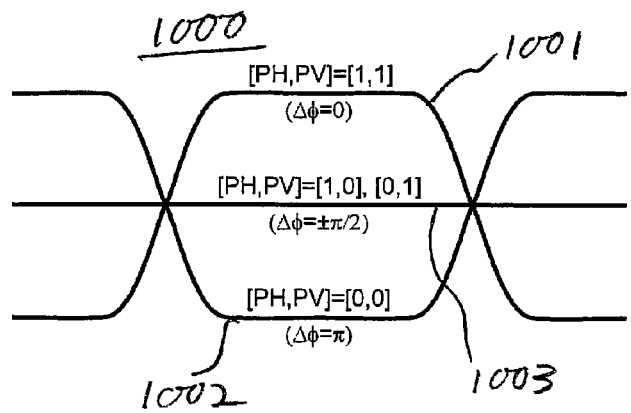
FIG. 10 is an idealized eye diagram of the output of a receiver in accordance with an embodiment.

When a DP-QPSK transmitter is connected back-to-back with the receiver 800, the resultant optical eye diagram will resemble eye diagram 1000 illustrated in FIG. 10. The rails of the eye diagram 1000 are determined by the polarization state of each symbol, rather than the relative phases of subsequent symbols, as discussed with respect to eye-diagram 600 of FIG. 6. Specifically, the top rail 1001 represents symbols in which (PH, PV)=(1,1); the bottom rail 1002 represents symbols in which (PH, PV)=(0,0); and the middle rail 1003 represents symbols in which either (PH, PV)=(1,0) or (PH, PV)=(0,1). The polarizer-based receiver 800 can thus, in essence, sum the weight of codewords in the PH and PV tributaries.

Under a worst-case rotation in the fiber, the received states at the receiver 800 might become 0 deg linear, −90 deg linear, LH circular, and RH circular, for example, such that all four states result in the same receiver output and the received label amplitude goes to zero. One option for dealing with this worst-case is to rapidly scramble the polarization of the signal before receiver 800. However, this would require a reduction in label data rate or receiver sensitivity.

Figure 9:
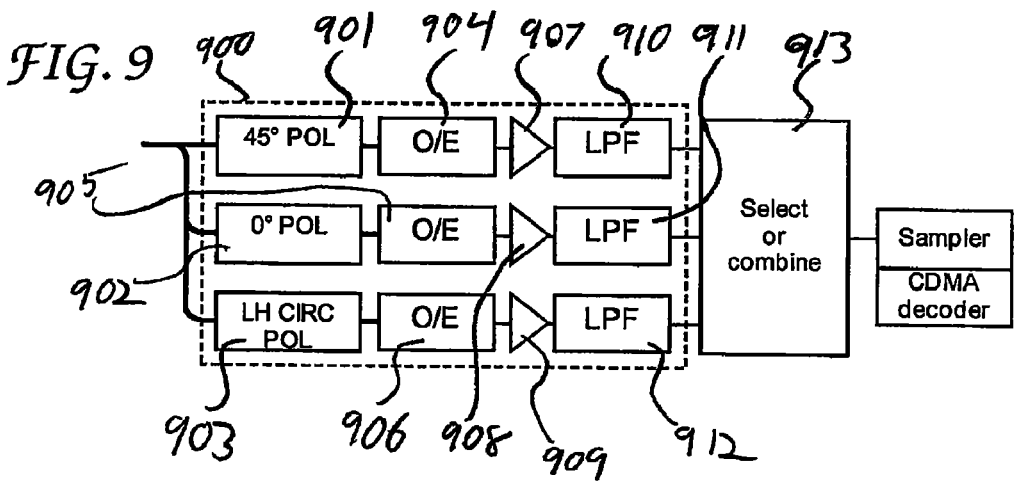
FIG. 9 is a receiver for PolSK-encoded labels in accordance with a further embodiment.

In order to maintain the label data rate and receiver sensitivity, a polarization-diverse receiver, such as receiver 900 illustrated in FIG. 9, can be utilized. A polarization diverse receiver splits the DP-QPSK signal into multiple signals, each of which is input into a different polarizer. For example, as illustrated in FIG. 9 the split DP-QPSK signal is input into three polarizers separated by 90° on the Poincare sphere (e.g. +45° linear, 0° linear, and left-hand circular). That is, a first one of the split signals is input into a +45 degree linear polarizer 901, followed by an optical-to-electrical converter 904 incorporating a low-speed photodetector, an amplifier 907, and a low-pass filter 910. A second one of the split signals is input into a 0 degree linear polarizer 902, followed by an optical-to-electrical converter 905904 incorporating a low-speed photodetector, an amplifier 908, and a low-pass filter 911. A third one of the split signals is input into a left-hand (LH) circular polarizer 903, followed by an optical-to-electrical converter 906904 incorporating a low-speed photodetector, an amplifier 909, and a low-pass filter 912.

The output of the low-pass filters 910, 911, and 912 are input into component 913, which selects the branch with the strongest signal or combines outputs from all photodetectors. As will be recognized by one skilled in the art, combining outputs from the three branches is not necessarily a simple addition, but may be a more complex algorithm designed to optimize sensitivity of the receiver, which may be carried out in a digital computation device. This polarization-diverse design of receiver 900 allows for the ability to send multiple label streams on different polarization axes, further increasing the aggregate label data rate.

Figure 11A:
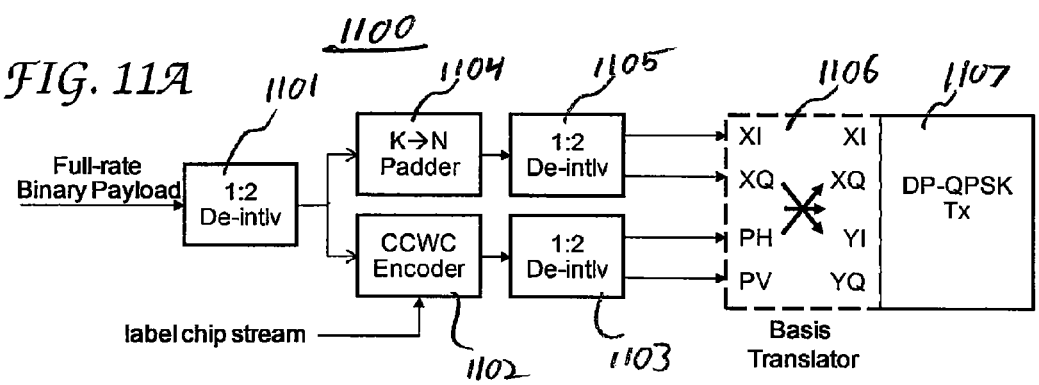
FIG. 11A is a DP-QPSK transmitter encoder in accordance with an embodiment.

In further view of the description of the phasor diagram of FIG. 4, a PolSK formatted label can be encoded in a DP-QPSK signal by applying a CCWC coding to the PH and PV tributary streams of the DP-QPSK signal and performing a linear transformation of the PH and PV tributaries to the YI and YQ tributary-basis expected by DP-QPSK transmitters. For example, FIG. 11A illustrates an encoder 1100 for transmitting a label encoded DP-QPSK signal. The encoder 1100 receives the full-rate binary payload at deinterleaver 1101, which outputs two data streams. The first data stream and the label chip stream are input to a CCWC encoder 1102. The output of the CCWC encoder is processed by deinterleaver 1103 to output two data streams representing the PH tributary and PV tributary of the DP-QPSK signal. The second data stream output by deinterleaver 1101 is processed by a K→N padder 1104 to ensure that all tributaries have the same symbol rate. The output of the K→N padder 1104 is deinterleaved at deinterleaver 1105 resulting in the XI and XQ tributaries. Thus, in accordance with encoder 1100, the XI and XQ tributaries do not experience CCWC coding. The XI, XQ, PH, and PV data streams are then input to a basis translator 1106, which transforms the PH and PV data streams to the YI and YQ tributaries expected by the DP-QPSK transmitter 1107.

Figure 11B:
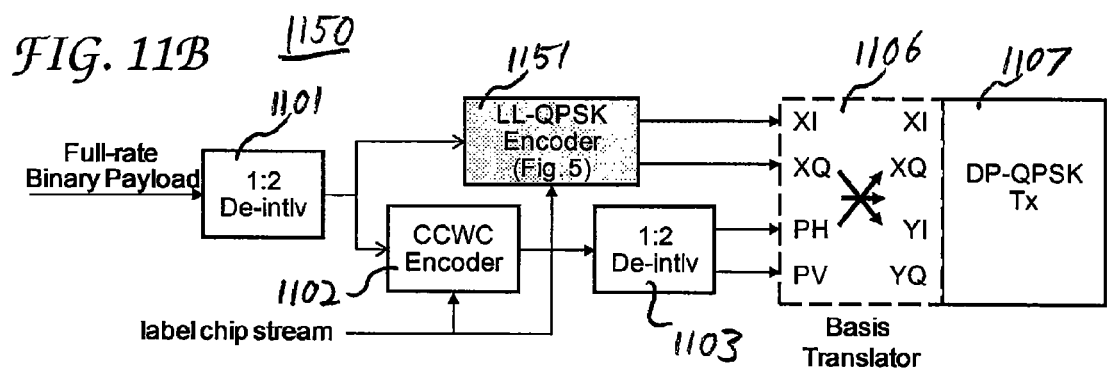
FIG. 11B is a DP-QPSK transmitter in accordance with an embodiment.
Figure 11C:
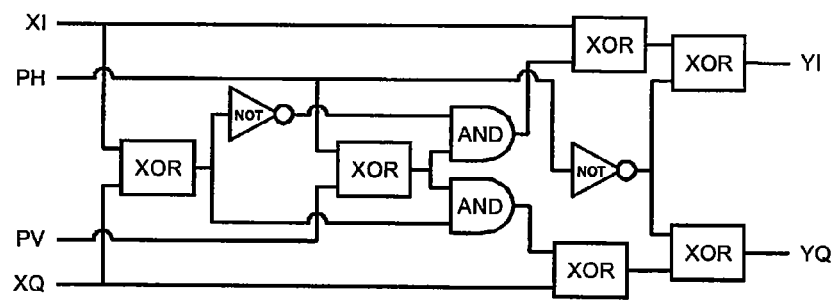
FIG. 11C is a basis translator of the DP-QPSK transmitter illustrated in FIGS. 11A and 11B in accordance with an embodiment.

A logic diagram 1160 of the basis translator 1106 is illustrated in FIG. 11C. As would be apparent to a person of ordinary skill in the art, the logic diagram encodes the Boolean equations for computing YI and YQ based on XI, XQ, PH, and PV. Specifically, it is illustrated that:

$$YI = \neg PH \oplus \{XI + [\neg (XI \oplus XQ) \otimes (PH \oplus PV)]\}; \text{ and}$$

$$YQ = \neg PH \oplus \{XQ + [(XI \oplus XQ) \otimes (PH \oplus PV)]\}.$$

The transmitter 1100 illustrated in FIG. 11A can modified as illustrated by the transmitter 1150 of FIG. 11B. Specifically, rather than applying a K→N padder and deinterleaver to output the XI and XQ tributaries, an encoding apparatus LL-QPSK 1151, such as the QPSK label encoder 700 illustrated in FIG. 7, can be utilized to encode the label in the XI and XQ tributaries of the DP-QPSK signal. Thus, the label is encoded in DPSK format into the XI and XQ tributaries of the DP-QPSK signal such that a delay interferometer based receiver (e.g., receiver 500, FIG. 5) can determine the label, and the label is also encoded in PolSK format into all four tributaries such that a polarizer-based receiver (e.g., receiver 800 or receiver 900) can determine the label. In this manner, either type of label receiver can be used within the same network and along the same lightpath. Alternatively, the label bandwidth could be doubled by applying independent label data to the phase-based encoder 1151 and polarization-based encoder (e.g., CCWC encoder 1102).

Although the polarizer-based label receiver 900 of FIG. 9 uses more elements than the delay interferometer based label receiver 500 of FIG. 5, the polarizer-based receiver 900 could be assembled from inexpensive commodity parts and would not require temperature stabilization. The design of label receiver 800 and label receiver 900 also allow the symbol rate to be independent of the channel spacing.

The foregoing Detailed Description is to be understood as being in every respect illustrative and exemplary, but not restrictive, and the scope of the application disclosed herein is not to be determined from the Detailed Description, but rather from the claims as interpreted according to the full breadth permitted by the patent laws. It is to be understood that the embodiments shown and described herein are only illustrative of the principles of the present application and that various modifications may be implemented by those skilled in the art without departing from the scope and spirit of the application. Those skilled in the art could implement various other feature combinations without departing from the scope and spirit of the application. The various functional modules that are shown are for illustrative purposes only, and may be combined, rearranged and/or otherwise modified.

We claim:

1. A method for encoding a label in a quaternary phase shift keying signal comprising:
   combining, by an encoder, a label frame comprising a binary encoding of the label, a binary signature sequence for code-division multiple access, and a first binary data payload into a first composite data stream;
   deinterleaving the first composite data stream into a first data stream and a second data stream; and
   differentially precoding the first data stream and the second data stream to output a respective first quaternary phase shift keying tributary and a second quaternary phase shift keying tributary, wherein the quaternary phase shift keying signal is a dual polarization quaternary phase shift keying signal, and the first quaternary phase shift keying tributary and the second quaternary phase shift keying tributary are a respective first tributary and a second tributary of a first polarization of the dual polarization quaternary phase shift keying signal;

combining the label frame, the binary signature sequence, and a second binary data payload into a second composite data stream;

deinterleaving the second composite data stream into a third data stream and a fourth data stream; and differentially precoding the third data stream and the fourth data stream to output a respective first quaternary phase shift keying tributary and a second quaternary phase shift keying tributary of a second polarization of the dual polarization quaternary phase shift keying signal.

2. The method of claim 1, wherein the label has a constant number of phase transitions per block, each block having a predetermined number of bits.

3. The method of claim 1, wherein the label frame, the signature sequence, and the data payload are combined using a complementary constant-weight code encoding.

4. A method for determining a label encoding in a dual polarization quaternary phase shift keying encoded signal having a first symbol rate, the method comprising:

splitting the dual polarization quaternary phase shift keying encoded signal into at least a first dual polarization quaternary phase shift keying signal and a second dual polarization quaternary phase shift keying signal;

applying a first polarizer to the first dual polarization quaternary phase shift keying signal to analyze a first polarization component of the signal;

detecting the first polarization component with a first low-speed photodetector configured to output a magnitude of the first polarization component at a rate significantly slower than the first symbol rate;

applying a second polarizer to the second dual polarization quaternary phase shift keying signal to analyze a second polarization component;

detecting the second polarization component with a second low-speed photodetector configured to output a magnitude of the second polarization component; and determining the label encoding based on the magnitude of the first polarization component that is output from the first low-speed photodetector, wherein the first polarizer selects a first selected polarization from one of a linear polarization and a circular polarization, and the second polarizer selects a polarization separated by 90 degrees on the poincare sphere from the first selected polarization.

5. The method of claim 4, wherein the determining the label encoding comprises selecting a strongest output from among the magnitude of the first polarization component that is output from the first low-speed photodetector and the magnitude of the second polarization component that is output from the second low-speed photodetector.

6. The method of claim 4, wherein the determining the label encoding comprises:

computing a weighted linear combination of the magnitude of the first polarization component that is output from the first low-speed photodetector and the magnitude of the second polarization component that is output from the second low-speed photodetector.

7. A method of encoding a label in a dual polarization quaternary phase shift keying signal comprising:

deinterleaving, by an encoder, a binary payload having a symbol rate into a first input data stream and a second input data stream;

converting the first input data stream into a first polarized signal having an I tributary (XI) and a Q tributary (XQ);

applying a complementary constant-weight code encoding to the second input data stream and a binary chip stream incorporating label data to generate a constant-weight code encoded signal;

deinterleaving the constant-weight code encoded signal to determine a horizontal polarization (PH) tributary and a vertical polarization (PV) tributary;

translating the PH, and PV into data streams defining an I tributary (YI) and a Q tributary (YQ) of a second polarized signal; and generating the dual polarization quaternary phase shift keying signal based on XI, XQ, YI, and YQ.

8. The method of claim 7, wherein the translating further comprises:

applying a basis translation to PH and PV to convert PH and PV into a second polarized signal, the basis translation determining YI as:

$$YI = \neg PH \oplus \{XI + [\neg (XI \oplus XQ) \otimes (PH \oplus PV)]\}$$

and determining YQ as:

$$YQ = \neg PH \oplus \{XQ + [(XI \oplus XQ) \otimes (PH \oplus PV)]\}.$$

9. The method of claim 7, wherein the converting the first input data stream into the first polarized signal comprises:

padding the first input data stream into a padded first input data stream to match a symbol rate of the constant-weight code encoding; and deinterleaving the padded first input data stream into the XI tributary and the XQ tributary.

10. The method of claim 7, wherein the converting the first input data stream into the first polarized signal comprises:

applying a complementary constant-weight code encoding to a binary chip stream incorporating label data and the first input data stream to create a constant-weight code encoded first input data stream;

deinterleaving the constant-weight code encoded first input data stream into the XI tributary and the XQ tributary; and differentially precoding each of the XI tributary and the XQ tributary.

* * * * *